(12) United States Patent
Martin et al.

(10) Patent No.: US 8,465,164 B2
(45) Date of Patent: Jun. 18, 2013

(54) MIRROR ASSEMBLY INCLUDING FOAM ENCOMPASSED WITHIN A POLYMER MATRIX

(75) Inventors: Yves Martin, Ossining, NY (US);
Robert L. Sandstrom, Chestnut Ridge, NY (US); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 12/890,173

(22) Filed: Sep. 24, 2010

(65) Prior Publication Data

US 2012/0075734 A1      Mar. 29, 2012

(51) Int. Cl.
*G02B 5/08* (2006.01)
*G02B 5/10* (2006.01)
*B05D 5/06* (2006.01)

(52) U.S. Cl.
USPC .......................... 359/883; 359/869; 427/162

(58) Field of Classification Search
USPC ......................................... 359/883, 884, 879
See application file for complete search history.

(56) References Cited

U.S. PATENT DOCUMENTS

| | | | |
|---|---|---|---|
| 3,912,380 A | 10/1975 | Klein | |
| 4,124,277 A * | 11/1978 | Stang | 359/846 |
| 4,202,715 A | 5/1980 | Ziemba | |
| 4,238,265 A * | 12/1980 | Deminet | 156/221 |
| 4,875,766 A | 10/1989 | Shimodaira et al. | |
| 5,613,761 A | 3/1997 | Raby, Sr. et al. | |
| 5,956,191 A | 9/1999 | Blackmon et al. | |
| 6,739,729 B1 | 5/2004 | Blackmon et al. | |
| 7,077,532 B1 | 7/2006 | Diver, Jr. et al. | |
| 7,309,398 B2 | 12/2007 | Blackmon et al. | |
| 7,550,054 B2 | 6/2009 | Lasich | |
| 2006/0092535 A1 | 5/2006 | Romeo | |

OTHER PUBLICATIONS

Borra, E.F., et al., "Optical Shop Tests of a f/1.2 2.5 Meter Diameter Liquid Mirror," The Astrophysical Journal, vol. 418, Dec. 1993, pp. 943-946.
Hickson, Paul, et al., "Large Astronomical Liquid Mirrors," Publications of the Astronomical Society of the Public, vol. 105, May 1993, pp. 501-508.

* cited by examiner

*Primary Examiner* — Jade R Chwasz
(74) *Attorney, Agent, or Firm* — Cantor Colburn LLP; Vazken Alexanian

(57) ABSTRACT

A mirror includes a first layer including reflective material to reflect incident light, an adhesive backing disposed at a rear of the first layer, a second layer connected to the adhesive backing and including one or more layers of a cloth or a non woven fiber matrix and polymer composite to encompass the cloth other non woven fiber matrix and a third layer disposed at a rear of the second layer and including polystyrene foam spheres encompassed within a polymer matrix.

18 Claims, 4 Drawing Sheets

MIRROR ASSEMBLY INCLUDING FOAM ENCOMPASSED WITHIN A POLYMER MATRIX

BACKGROUND

Aspects of the present invention are directed to a mirror assembly and a method of assembling a mirror.

Solar concentrator systems typically employ an optical device to focus light on a small photovoltaic or photo-thermal receiver. It is intended that concentrator systems achieve lower cost relative to flat panel photovoltaic solar systems by using low cost optics in place of expensive semiconductor materials. Reflective mirrors are common choice for concentrator optics that focus light in one or two dimensions. It is important that a concentrating mirror have a dimensionally stable, optically smooth reflective surface. A parabolic shape is a common choice to focus incident light, such as nearly parallel sunlight to a line (one dimensional concentration) or a spot (two dimensional concentration).

Glass is a material that is commonly used to construct mirrors that are dimensionally stable. However, since it is desirable that the mirror also be low cost with weight being a factor that effects overall system cost, use of glass often results in added weight and therefore overall costs. This is particularly true in two dimensional concentrators where the system is moved to orient the mirror to the sun (tracking) in two dimensions.

SUMMARY

In accordance with an aspect of the invention, a mirror is provided and includes a first layer including reflective material to reflect incident light, an adhesive backing disposed at a rear of the first layer, a second layer connected to the adhesive backing and including one or more layers of a cloth or a non woven fiber matrix and polymer composite to encompass the cloth or the non woven fiber matrix and a third layer disposed at a rear of the second layer and including polystyrene foam spheres encompassed within a polymer matrix.

In accordance with an aspect of the invention, a mirror is provided and includes an intermediate layer of polymer impregnated cloth or a non woven fiber matrix having a parabolic cross-sectional shape and opposing concave and convex sides, an adhesive backed reflective layer disposed on the concave side of the intermediate layer and a backing layer including polymer impregnated polystyrene foam spheres disposed on the convex side of the intermediate layer, the backing layer having a concave side in contact with the convex side of the intermediate layer and a back side opposing the concave side.

In accordance with an aspect of the invention, a method of assembling a mirror is provided and includes providing a mold with a parabolic shape, disposing polymer impregnated cloth on the mold with the polymer in a liquid state, solidifying the impregnating polymer to form an intermediate layer having a parabolic cross-sectional shape and opposing concave and convex sides, applying polymer coated polystyrene foam spheres to the convex side of the intermediate layer with the polymer in a liquid state and solidifying the coating polymer to form a backing layer including polystyrene foam spheres in a polymer matrix.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

Figure 1:
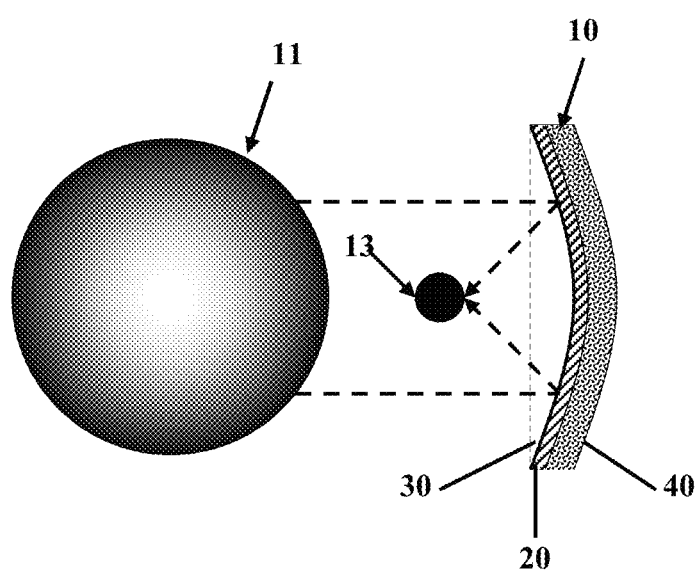
FIG. 1 is a schematic side view of a mirror.
Figure 2:
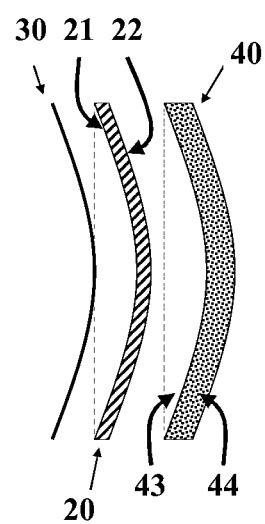
FIG. 2 is an exploded side view of the mirror of FIG. 1.
Figure 3:
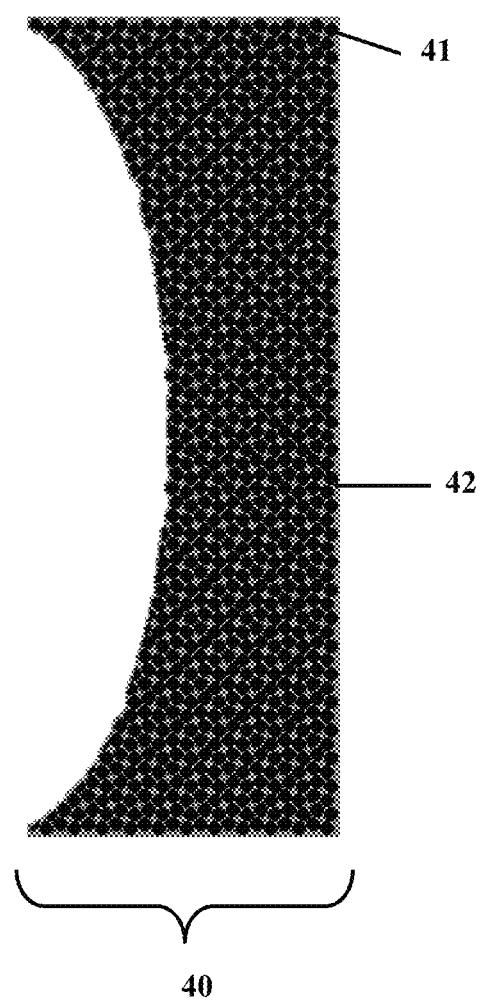
FIG. 3 is an enlarged view of a backing layer of the mirror of FIG. 1.

With reference to FIGS. 1-3, a mirror 10 is provided to focus incident light from a light source 11, such as for example substantially parallel light emitted from the sun, into a two dimensional spot or a one dimensional line at photovoltaic or photo-thermal receiver 13. The mirror 10 includes an intermediate layer 20 of polymer impregnated cloth or random or non woven fiber matrix fill having a parabolic cross-sectional shape and opposing concave and convex sides 21, 22, an adhesive backed reflective layer 30 applied to the concave side 21 of the intermediate layer 20 and a backing layer 40. The backing layer 40 includes polymer impregnated polystyrene foam spheres 41 applied to the convex side 22 of the intermediate layer 20. As such, the backing layer 40 is formed to have a concave side 42 in contact with the convex side 22 of the intermediate layer 20 and a back side 43 opposing the concave side 42.

In accordance with embodiments, the parabolic cross-sectional shape of the intermediate layer 20 may be configured such that the adhesive backed reflective layer 30 focuses light into a spot. In these cases, the intermediate layer 20 is parabolic in at least two dimensions (i.e., length-wise and width-wise). By contrast, in accordance with alternative embodiments, the parabolic cross-sectional shape of the intermediate layer 20 may be configured such that the adhesive backed reflective layer 30 focuses light into a line. In these cases, the intermediate layer 20 is parabolic in one or more dimensions (i.e., length-wise).

The polymers of the intermediate layer 20 and the backing layer 40 may be substantially similar or different from one another. For example, thermoplastic polymers and various curable polymers or crosslinkable rubbers can be used depending on the desired manufacturing conditions and required performance such as mechanical, thermal, or optical properties, durability and reliability for the mirror 10.

Representative thermoplastic polymers include polyethylene, polypropylene, ethylene-α-olefin copolymers such as ethylene-propylene copolymers, polymethylpentene, polyvinyl chloride, polyvinylidene chloride, polyvinyl acetate, ethylene-vinyl acetate copolymers, polyvinyl alcohol, polyvinylacetal, fluororesins such as polyvinylidene fluoride and polytetrafluoroethylene, polyesters such as polyethylene terephthalate, polybutylene terephthalate, and polyethylene naphthalate, polystyrene, polyacrylonitrile, styrene-acrylonitrile copolymers, acrylonitrile-butadiene-styrene, polyphenylene ether and modified polyphenylene ethers, aliphatic and aromatic polyamides, polyimides, polyamide imides, polymethacrylic acid and poly(arylene sulfide methacrylates) such as methyl arylene esters of polymethacrylic acid, poly-acrylic acids, polycarbonate, polyphenylene sulfide, polysulfone, polyether sulfone, polyether nitrile, polyether ketone, polyketone, liquid crystal polymers, and silicone.

The curable polymer can be an epoxy, polyimide, acrylic, bis-maleimide, benzocyclobutene, phenol, unsaturated polyester, diallyl phthalate, vinyl butyral, silicone, polyurethane, polyimide silicone or a thermosetting polyphenylene ether. The cross-linkable rubber includes natural rubber, butadiene rubber, isoprene rubber, styrene-butadiene copolymer rubber, nitrile rubber, hydrogenated nitrile rubber, chloroprene rubber, ethylene-propylene rubber, chlorinated polyethylene, chlorosulfonated polyethylene, butyl rubber and halogenated butyl rubber, fluorine rubber, urethane rubber, silicone rubber, and liquid rubber. The polymer materials may be used alone or in combination of two or more thereof. Polymer alloys may be used.

Solidification of the polymer can occur by cooling of a thermoplastic polymer, or curing, which includes crosslinking. The method for cure of the curable polymers or the cross-linkable rubbers is not particularly specified, and may include thermosetting, photocuring, wet curing, use of a crosslinking agent, or by radiating a radial ray or an electron beam. In either case, the polymers of the intermediate layer 20 and the backing layer 40 may each include an epoxy resin, for example a two-part curable epoxy resin.

The cloth of the intermediate layer 20 may be woven or nonwoven, and may include at least one or more of fiberglass, carbon fibers such as pitch-based or polyacrylonitrile (PAN)-based carbon fibers, polymeric carbon fibers such as polyamide (Nylon), poly(ethylene terephthalate), poly(butylene terephthalate, phenol-formaldehyde, polyvinyl alcohol, polyvinyl chloride fiber, polyolefins such as polyproplyene and polyethylene, aromatic polyamides (aramid fibers, such as Kevlar®), ceramic fibers, for example, fibers or whiskers comprising aluminum oxides, titanium oxides, silicon nitride, silicon carbide, aluminum borate, and potassium, and omni-directional pressed glass fibers. Where fiberglass is used, the intermediate layer 20 may include two layers of, e.g., epoxy resin impregnated fiberglass cloth in which the first layer is a 1 oz. bidirectional weave and the second layer is a 2 oz. bidirectional weave. Where the omni-directional pressed glass fibers are used, they may be provided in a mat of pressed glass fibers. In another embodiment, loose glass micro fibers are mixed directly with epoxy resin and hardener.

The adhesive backed reflective layer 30 may include at least one or more of silver and aluminum adhesive backed polished films. As an example, the adhesive backed reflective layer 30 may includes Reflectech™ film having a plastic outer layer, a silver second surface and backside coatings on which adhesive is applied.

Different types of adhesives can be used, for example contact adhesives, hot melt adhesives, two-part adhesives, pressure sensitive adhesives and the like, depending on the desired manufacturing conditions and required performance such as mechanical, thermal, or optical properties, durability and reliability for the mirror 10. Representative adhesives include natural rubbers, nitrile rubbers, butyl rubbers, acrylics, cyanoacrylics, epoxies, styrene-butadiene-styrenes, styrene-ethylene-propylene, polyurethanes, polyesters, polyamides, polyvinyl butyrals, polyvinyl alcohols, polyurethanes and polyacrylonitriles.

A thickness of the intermediate layer 20 may be about 1 millimeter whereby the backing layer 40 is sufficiently thick such that the mirror 10 is substantially rigid and therefore dimensionally stable. In some embodiments, the backing layer is about 1.5 to upwards of about 10 times as thick as the intermediate layer 20. Despite this thickness, however, due to the use of the polystyrene foam spheres in the backing layer, a weight of the backing layer 40 and the mirror 10 as a whole may be maintained below a predefined weight limit. Thus, costs associated with the mirror 10 can be correspondingly maintained below a predefined budget. In an exemplary embodiment, the intermediate layer 20 is on the order of 10 mm thick and the backing layer 40 is eliminated (or has a substantially zero thickness).

The backing layer 40 may be formed of polystyrene foam spheres 41 that are coated with, e.g., epoxy resin 42. The coating may result in at least partial impregnation of the foam spheres 41. The epoxy resin 42 at least partially fills the interstitial spaces between the spheres 41. The spheres 41, therefore, adhere to adjacent spheres 41 and/or contact surfaces of the intermediate layer 20. Thus, the backing layer 40 is able to be form fit to any shaped element, surface or component to which it is applied while retaining the ability to be form fit to other elements, surfaces or components. That is, as shown in FIG. 3, the backing layer 40 may be formed to have a concave side 43 in contact with the convex side 22 of the intermediate layer 20 and a substantially flat back side 44 opposing the concave side 43. The backing layer 40 may further include additional structural features by which the backing layer 40, in particular, and the mirror 10 as a whole can be coupled with another device. Loose fiber or micro fibers may be added to the epoxy in the backing layer 40 to enhance stiffness and cohesion.

In accordance with a further aspect of the invention, a method of assembling the mirror 10 is provided. The method includes first providing a mold with a parabolic shape and disposing polymer impregnated cloth on the mold with the polymer in a liquid state. The polymer is then solidified or cured to form the intermediate layer 20 as having the parabolic cross-sectional shape and the opposing concave and convex sides 21, 22. With the intermediate layer 20 formed, polymer impregnated polystyrene foam spheres 41, which have been coated with the polymer or epoxy resin, may be applied to the convex side 22 of the intermediate layer 20 with the polymer in a liquid state. This polymer is then solidified or cured as well to form the backing layer 40 including the polymer impregnated polystyrene foam spheres 41. Eventually, the adhesive backed reflective layer 30 is applied to the concave side 21 of the intermediate layer 20. The curing discussed above may also be accomplished by evaporating a solvent of a liquid state polymer.

An alternative method includes conforming the reflective layer 30 to the mold and then molding the remaining layers. In another embodiment, the reflective layer 30 is stretched over a frame and pressurized to form a substantially parabolic shape on which the intermediate layer 20 and the backing layer 40 are applied (self molding method).

When used, the curing of the polymers to form the intermediate layer 20 and the backing layer 40 may include leaving the intermediate layer 20 and the backing layer 40 to harden, heat treatments and/or UV curing treatments. The backing layer 40 may be adhered to the convex side 22 of the intermediate layer 20 via adhesive applied between the two layers or by the curing process itself whereby the polymers of each layer form bonds and, in some cases, atomic level bonds, with one another.

Figure 4:
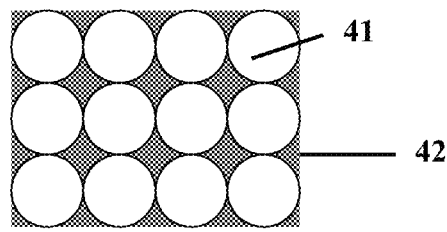
FIG. 4 is an enlarged view of a backing layer of the mirror of FIG. 1 with substantially uniform polystyrene spheres.
Figure 5:
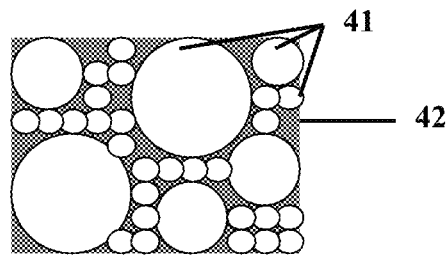
FIG. 5 is an enlarged view of a backing layer of the mirror of FIG. 1 with variously sized polystyrene spheres randomly distributed.
Figure 6:
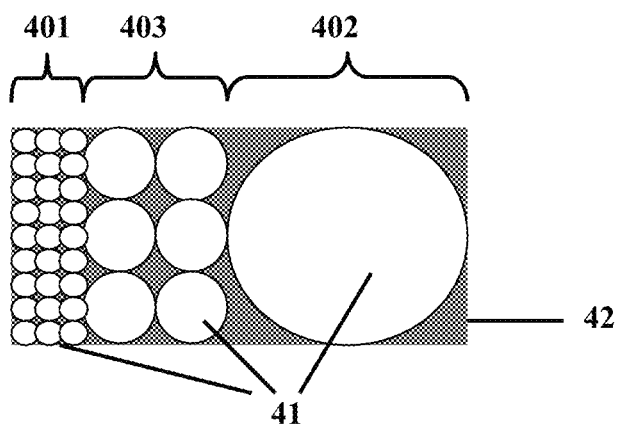
FIG. 6 is an enlarged view of a backing layer of the mirror of FIG. 1 with variously sized polystyrene spheres distributed in a substantially ordered structure.

With reference to FIGS. 4, 5 and 6, it is noted that the polystyrene foam spheres 41 may have respective diameters in the range of about 0.1 cm to about 1.5 cm. With that range, the polystyrene foam spheres 41 may be substantially uniform in shape and size they may have varied shapes and sizes from sphere to sphere. For example, as shown in FIG. 4, the polystyrene foam spheres 41 have substantially uniform sizes. In this way, overall physical characteristics of the backing layer 40, such as its weight and its shape, can be predicted and controlled.

By contrast, as shown in FIG. 5, the polystyrene foam spheres 41 may have various shapes and sizes with each variously shaped and sized polystyrene foam sphere 41 distributed substantially randomly throughout the backing layer 40. In this case, the formation of the backing layer 40 requires little control at least as compared to the backing layer of FIG. 4 in that the polystyrene foam spheres 41 may be permitted to grow at their natural rates within the matrix. In addition, when forming the overall shape of the backing layer 40, the presence of the relatively small polystyrene foam spheres 41 in the matrix increases a likelihood that space around the convex side 22 of the intermediate layer 20 will be filled by polystyrene foam spheres 41.

Still further, as shown in FIG. 6, the polystyrene foam spheres 41 may have various shapes and sizes with each variously shaped and sized polystyrene foam sphere 41 distributed in a substantially ordered arrangement throughout the backing layer 40. In this case, the backing layer 40 may be defined as multiple sub-layers with each sub-layer having a characteristic polystyrene foam sphere 41 size. For example, the smallest polystyrene foam spheres 41 could form a forward layer 401 that could be relatively precisely molded around the convex side 22 of the intermediate layer 20, the largest polystyrene foam spheres 41 could form a rear layer 402 and the medium sized polystyrene foam spheres 41 could form a transitional layer 403 from the forward layer 401 to the rear layer 402. In this way, the backing layer 40 could be relatively precisely fit around the intermediate layer 20 and, with the rear layer 402 formed relatively thickly so that a large number of the largest polystyrene foam spheres 41 are used, a weight of the backing layer 40 could be maintained below a predefined limit. In an example, small spheres may progress to large spheres such that stress due to curing of the polymer does not deflect the parabolic shape.

In accordance with a further aspect of the invention, the method of assembling the mirror 10 may be further described in that the application of the polymer impregnated polystyrene foam spheres 41 coated with the polymer or epoxy resin to the convex side 22 of the intermediate layer 20 may provide the backing layer 40 with multiple sub-layers. That is, the applying may include applying smallest coated polymer impregnated foam spheres 41 to the convex side 22 of the intermediate layer 20 in a forward layer 401 and then similarly applying larger coated polystyrene foam spheres 41 in transitional and rear layers 403 and 402, respectively.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A mirror, comprising:
   a first layer including reflective material to reflect incident light,
   an adhesive backing disposed at a rear of the first layer;
   a second layer connected to the adhesive backing and including one or more layers of a cloth or a non woven fiber matrix and polymer composite to encompass the cloth or the non woven fiber matrix; and
   a third layer disposed at a rear of the second layer and including polystyrene foam spheres encompassed within a polymer matrix, the third layer including:
   a forward layer with small polystyrene foam spheres, which is precisely molded to a shape of the rear of the second layer;
   a rear layer with large polystyrene foam spheres; and
   an intermediate layer with medium sized polystyrene foam spheres to form a transitional layer from the forward layer to the rear layer.

2. The mirror according to claim 1, wherein the second layer comprises epoxy resin impregnated fiberglass cloth.

3. The mirror according to claim 1, wherein the second layer comprises epoxy resin impregnated carbon fiber cloth.

4. The mirror according to claim 1, wherein the second layer comprises epoxy resin impregnated aramid fiber cloth.

5. The mirror according to claim 1, wherein the second layer comprises an epoxy resin impregnated omni-directional mat of pressed glass fibers.

6. The mirror according to claim 1, wherein the first layer comprises one of an adhesive backed polymer including a silver reflective layer or an adhesive backing disposed on an aluminum reflective layer.

7. A mirror, comprising:
   an intermediate layer of polymer impregnated cloth or a non woven fiber matrix having a parabolic cross-sectional shape and opposing concave and convex sides;
   an adhesive backed reflective layer disposed on the concave side of the intermediate layer; and
   a backing layer including polymer impregnated polystyrene foam spheres disposed on the convex side of the intermediate layer, the backing layer having a concave side in contact with the convex side of the intermediate layer and a back side opposing the concave side, the backing layer including:
   a forward layer with small polystyrene foam spheres, which is precisely molded to a shape of the convex side of the intermediate layer;
   a rear layer with large polystyrene foam spheres; and
   an intermediate layer with medium sized polystyrene foam spheres to form a transitional layer from the forward layer to the rear layer.

8. The mirror according to claim 7, wherein the parabolic cross-sectional shape is configured to focus light reflected from the adhesive backed reflective layer into one of a spot or a line.

9. The mirror according to claim 7, wherein the polymers of the intermediate layer and the backing layer comprise epoxy resin.

10. The mirror according to claim 7, wherein the backing layer is about 1.5 or more times thicker than the intermediate layer.

11. The mirror according to claim 7, wherein the cloth or the non woven fiber matrix comprises at least one or more of fiberglass, carbon fiber, aramid fiber and omni-directional pressed glass fibers.

12. The mirror according to claim 7, wherein the adhesive backed reflective layer comprises at least one or more of silver and aluminum.

13. A method of assembling a mirror, the method comprising:
   providing a mold with a parabolic shape;

disposing polymer impregnated cloth on the mold with the polymer in a liquid state;

solidifying the impregnating polymer to form an intermediate layer having a parabolic cross-sectional shape and opposing concave and convex sides;

applying polymer coated polystyrene foam spheres to the convex side of the intermediate layer with the polymer in a liquid state; and solidifying the coating polymer to form a backing layer including polystyrene foam spheres in a polymer matrix, wherein the applying comprises forming a backing layer with:

a forward layer of small polystyrene foam spheres, which is precisely molded to a shape of the convex side of the intermediate layer;

a rear layer with large polystyrene foam spheres; and an intermediate layer with medium sized polystyrene foam spheres to form a transitional layer from the forward layer to the rear layer.

14. The method according to claim 13, further comprising applying an adhesive backed reflective layer to the concave side of the intermediate layer.

15. The method according to claim 13, wherein the solidifying of the impregnating polymer to form the intermediate layer comprises curing the polymer or evaporating a solvent of the liquid state polymer.

16. The method according to claim 13, further comprising coating the polystyrene foam spheres with epoxy resin to produce the polymer coated polystyrene foam spheres.

17. The method according to claim 13, wherein the curing of the polymer to form the backing layer results in adhesion between the backing layer and the intermediate layer.

18. The method according to claim 13, wherein the solidifying of the coating polymer to form the backing layer comprises curing the coating polymer or evaporating a solvent of the liquid state polymer.

* * * * *